April 17, 1934.    M. GREITZER    1,955,063
PORTABLE POWER SAW
Filed Feb. 15, 1932
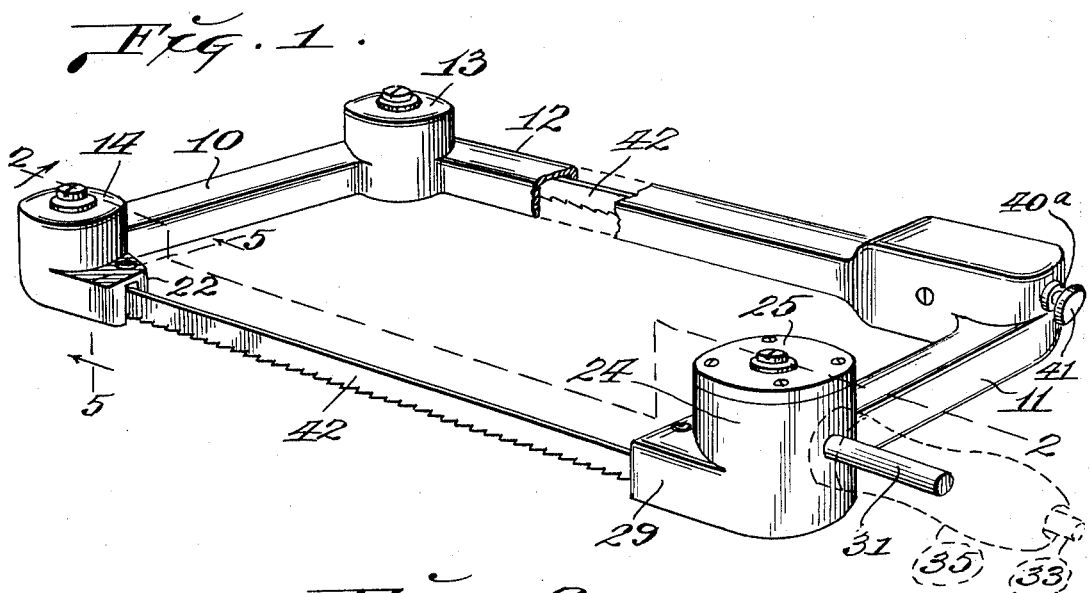
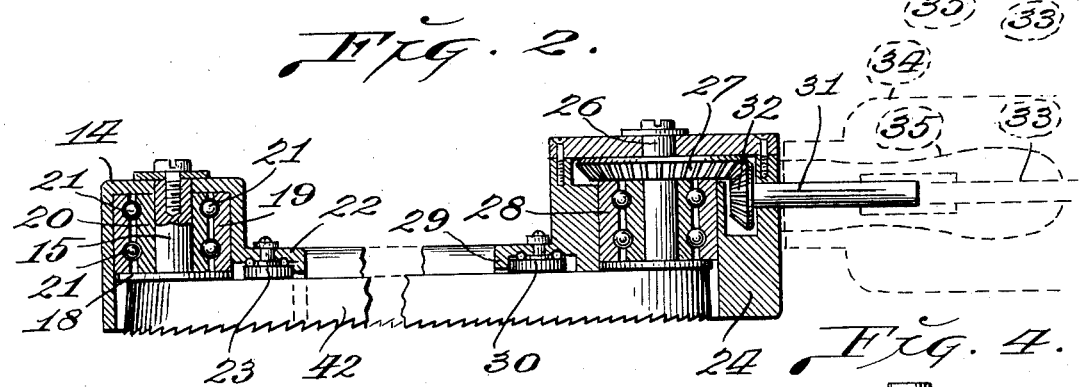
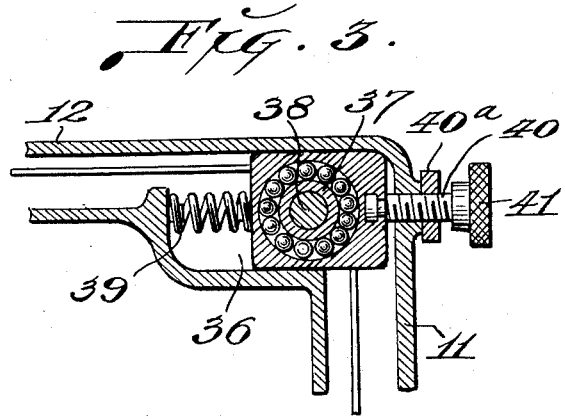
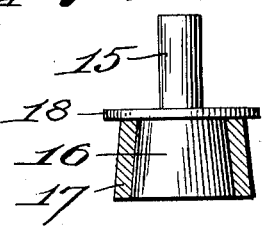
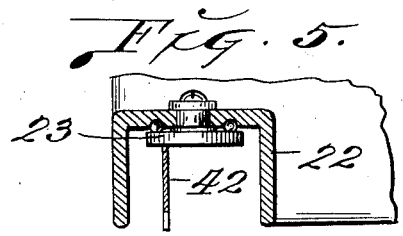
INVENTOR,
MEYER GREITZER.
By Martin P. Smith, Atty.

Patented Apr. 17, 1934

1,955,063

UNITED STATES PATENT OFFICE 1,955,063

PORTABLE POWER SAW

Meyer Greitzer, Los Angeles, Calif.

Application February 15, 1932, Serial No. 592,937

1 Claim. (Cl. 143—19)

My invention relates generally to saws and more particularly to a relatively small compact portable saw that is provided with a power driven endless blade and which may be conveniently manipulated by hand for accomplishing various sawing operations.

The principal objects of my invention are, to provide a manually operable power saw that is relatively simple in construction, inexpensive of manufacture and having a light, strong, durable frame, in which the continuous blade is mounted for operation, further, to arrange on said frame a plurality of rolling supports for the endless blade and to adjustably mount one of said rolling supports so as to conveniently take up any slack that may develop in the continuous blade while the same is in operation and further, to provide simple and efficient means for driving the continuous blade from suitable power, for instance, a small electric motor or a power driven flexible shaft.

Further objects of my invention are, to construct the frame of the saw so that the exposed portion of the continuous blade has ample room for engaging the work and to construct the frame and blade bearings so that different forms of blades may be conveniently interchanged in order to accomplish different sawing operations, for instance, rip saw work, cross cut work, metal cutting and the severing of bones in meat cutting.

With the foregoing and other objects in view, my invention consists in certain novel features of construction and arrangement of parts that will hereinafter be more fully described and claimed and illustrated in the accompanying drawing in which:

Fig. 1 is a perspective view of a portable power driven saw constructed in accordance with my invention.

Fig. 2 is an enlarged vertical section taken on the line 2—2 of Fig. 1.

Fig. 3 is a horizontal section through one corner of the frame of the saw and showing the adjustable bearing for the endless saw blade.

Fig. 4 is an elevational view of one of the saw supporting rollers, with the peripheral surface of said roller in section.

Fig. 5 is an enlarged cross section taken on the line 5—5 of Fig. 1.

The frame in my improved saw is preferably formed in a single piece from suitable light weight metal such as aluminum or aluminum alloy and said frame is substantially rectangular in form with one side open.

The numerals 10 and 11 designate the end rails of the frame and 12 the back or side rail, which rails are of inverted U-shape in cross section in order to permit the endless saw blades to be readily placed on the roller bearings at the corners of the frame.

Formed integral with the corner of the frame formed by the juncture of rails 10 and 11, is a housing 13, open at its lower end and a similar housing 14 is formed at the forward end of rail 10.

Journaled in the upper portions of these housings 13 and 14 are the upper ends of spindles such as 15 and formed integral with or fixed to the lower portion of each spindle, is a substantially cylindrical head 16 that functions as a saw blade supporting roller.

The peripheral portion of each head or roller is covered with a layer 17 of rubber, leather, fiber or the like, and the outer surface of this covering tapers gradually toward its upper end.

Projecting outwardly from the upper portion of the head or body 16, is a flange 18, that serves as a bearing for the upper edge of the endless blade during its travel upon the supporting roller.

Due to the slight taper imparted to the surface of the facing 17 of the rollers, the endless blade during operation, tends to move upwardly and consequently preventing the blade from accidentally riding off the supporting rollers.

Arranged between the walls of the housings 13 and 14 and the spindles 15, are antifriction bearings comprising outer races 19 that engage the housings 13, inner races 20 that engage the spindles 15 and balls 21 that occupy grooves in the adjacent faces of said races.

Formed integral with the housing 14 and projecting toward the free end of arm 11, is an extension 22 and journaled therein, is a horizontally disposed roller 23, against which the upper edge of the endless blade engages during operation.

Formed integral with the free end of arm 11, is an enlarged housing 24, open at its lower end and its upper end closed by a removable plate 25 and journaled in the center of this plate is the upper end of a spindle 26 that carries on its lower end a saw blade supporting roller that is identical in construction with the rollers comprising the parts 16, 17 and 18 previously described.

Secured on the upper portion of this spindle 26, is a beveled gear wheel 27 and arranged immediately beneath this beveled gear wheel and interposed between the spindle and the wall of the housing, is an antifriction bearing 28 that comprises inner and outer races and interposed balls or rollers.

Formed integral with the lower portion of housing 24 and projecting toward housing 14, is a hollow extension 29, in which is journaled a horizontally disposed roller 30, that serves as a bearing for the upper edge of the endless blade.

The rollers 23 and 30 serve as rolling supports for the endless blade and particularly for that portion that is exposed between the ends of the arms 10 and 11 and which exposed portion engages the work.

Journaled in housing 24 and disposed substantially at right angles to the arm 11, is a spindle 31 and carried by the inner end thereof is a beveled pinion 32 that meshes with the beveled gear wheel 27.

The outer end of this spindle may be detachably connected in any suitable manner to a power driven flexible shaft 33 or said spindle may be directly connected to the shaft of a small electric motor 34 and the housing of which latter serves as a handle for the manual manipulation of the saw.

Where spindle 31 is connected to a flexible shaft, a suitable handle such as 35 is detachably secured to housing 24 and encloses the projecting end of spindle 31 and the end of the flexible shaft that is connected thereto.

At the corner of the frame formed by the juncture of arms 11 and 12, portions of said arms are enlarged to form a chamber 36 and arranged for a limited degree of movement therein is an antifriction bearing 37, within which is journaled a spindle 38 similar to spindles 15 and which carries on its lower end a saw supporting roller.

The sliding movement of this bearing 37, through the chamber 36 toward housing 13, is opposed by an expansive coil spring 39 and connected by a suitable swiveled joint to the opposite side of this bearing, is the inner end of an adjusting screw 40, that is screw-seated in the end of the outer wall of arm 11 and the outer end of this screw carries a head 41.

An endless flexible saw blade 42 is mounted on the rollers carried by the lower ends of the spindles 15, 26 and 38 and by manipulation of screw 40 bearing 37 may be adjusted so as to change the position of the blade supporting roller carried by spindle 38 and consequently producing in said blade the desired tension.

This endless flexible saw blade is constructed so that the length of its upper edge is slightly shorter than the length of its toothed edge and thus when the blade is applied to the pulleys, it conforms to the cone shape of the pulleys and thus normally tends to maintain its position thereupon while the saw is in operation.

As spindle 31 is rotated by the directly connected motor 34 or the flexible shaft 33, pinion 32 will drive beveled gear wheel 27, thereby imparting rotary motion to spindle 26 and the blade receiving roller carried by the lower end of said spindle and thus the continuous blade will be caused to travel through the arms of the inverted channel-shaped frame and across the space between housings 14 and 24 and by manual engagement of the handle 35 or the motor that is connected to housing 24, the saw may be conveniently manipulated to accomplish the desired sawing operations.

The endless saw blade is supported by four rolling supports, preferably disposed in rectangular arrangement and the shape of the frame on which the rolling supports are mounted provides ample space, whereby the exposed portion of the blade may engage the work.

Spindle 38 may be conveniently adjusted so as to regulate the tension in the endless blade and the upward pressure resulting from the engagement of the exposed portion of the blade with the work, is resisted by the rollers 23 and 30 that bear on the upper edge of the blade adjacent to the ends of the exposed portion thereof.

In order to decrease the friction of rollers 23 and 30 while the same are rotated as a result of contact with the upper edge of the blade, suitable antifriction bearings, either balls or rollers, may be placed between said rollers and the upper portions of the housings 22 and 29.

After screw 40 has been manipulated so as to properly adjust the position of bearing 37 in which spindle 38 is mounted, the parts may be locked in their adjusted positions by means of a lock nut 40ª, that is positioned on screw 40.

Thus it will be seen that I have provided a portable power saw that is relatively simple in construction, capable of being easily and conveniently handled and placed in different positions so as to facilitate different sawing operations and which saw is very effective in performing the functions for which it is intended.

It will be understood that minor changes in the size, form and construction of the various parts of my improved portable power saw may be made and substituted for those herein shown and described without departing from the spirit of my invention, the scope of which is set forth in the appended claim.

I claim as my invention:

In a portable power saw, a rectangular frame open on one side the legs of which frame are channel shape in cross section, housings formed at the corners of said frame and at the free ends of the parallel arms thereof, antifriction bearings within said housings, shafts journaled in said bearings, circular heads on the lower ends of said shafts, an endless flexible saw blade mounted for operation on said heads, which saw blade passes through the legs of said frame and across the opening on the side thereof, hollow extensions projecting toward each other from the housings on the free ends of the parallel arms of said frame, discs arranged within said extensions and journaled on axes disposed at right angles to the plane occupied by the frame for engaging the upper edge of the flexible saw blade at the ends of the opening in the side of said frame, the points of engagement between the upper edge of the saw and said discs being to one side of the axes of said discs, a beveled gear wheel carried by one of the shafts, a beveled pinion engaging said gear wheel, a shaft carrying said pinion and projecting from the frame of the saw and means for adjusting another one of the shafts to adjust the tension of the endless saw blade.

MEYER GREITZER.